United States Patent [19]

Misono et al.

[11] Patent Number: 5,237,439
[45] Date of Patent: Aug. 17, 1993

[54] PLASTIC-SUBSTRATE LIQUID CRYSTAL DISPLAY DEVICE WITH A HARD COAT CONTAINING BORON OR A BUFFER LAYER MADE OF TITANIUM OXIDE

[75] Inventors: Kenji Misono; Shunsei Fukuchi, both of Nara; Makoto Iwamoto, Yamatokooriyama; Kyouhei Isohata, Nara; Hiroshi Takanashi, Souraku, all of Japan

[73] Assignee: Sharp Kabushiki Kaisha, Osaka, Japan

[21] Appl. No.: 954,724

[22] Filed: Sep. 30, 1992

[30] Foreign Application Priority Data

Sep. 30, 1991 [JP] Japan .................. 3-252394

[51] Int. Cl.⁵ .................................. G02F 1/1333
[52] U.S. Cl. .................................. 359/74; 359/79
[58] Field of Search .................. 359/74, 79, 82

[56] References Cited

U.S. PATENT DOCUMENTS

| | | | |
|---|---|---|---|
| 4,709,991 | 12/1987 | Hoshikawa | 359/74 |
| 4,779,957 | 10/1988 | Suginoya et al. | 359/74 |
| 4,802,742 | 2/1989 | Ichikawa et al. | 359/74 |
| 4,929,060 | 5/1990 | Sugimoto et al. | 359/82 |
| 4,966,442 | 10/1990 | Ono et al. | 359/82 |

FOREIGN PATENT DOCUMENTS

| | | | |
|---|---|---|---|
| 55-135819 | 10/1980 | Japan | 359/79 |
| 57-182721 | 11/1982 | Japan | 359/79 |
| 59-137927 | 8/1984 | Japan | 359/74 |
| 60-260019 | 12/1985 | Japan | |
| 62-153826 | 7/1987 | Japan | 359/74 |

*Primary Examiner*—John S. Heyman
*Assistant Examiner*—Anita Pellman Gross
*Attorney, Agent, or Firm*—David G. Conlin; George W. Neuner

[57] ABSTRACT

A plastic-substrate liquid crystal display device has, on inner faces of a pair of plastic substrates 3 for sandwiching liquid crystals 10, a hard coat 4 made of an organic material, an SiOx undercoat 5, and an ITO electrode 6 in this order. Boron (B) is contained in the material of the hard coat 4. It is thus possible to enhance the adhesion property of the SiOx undercoat 5 and the ITO electrode 6 with respect to the substrate 3 and to prevent the occurrence of cracks therein.

2 Claims, 2 Drawing Sheets

PLASTIC-SUBSTRATE LIQUID CRYSTAL DISPLAY DEVICE WITH A HARD COAT CONTAINING BORON OR A BUFFER LAYER MADE OF TITANIUM OXIDE

BACKGROUND OF THE INVENTION

1. Field of the Invention

The present invention relates to a plastic-substrate liquid crystal display (LCD) device which utilizes plastic substrates as substrates for sandwiching liquid crystals.

2. Description of the Prior Art

There is conventionally provided a plastic-substrate LCD device shown in FIG. 3 as a LCD device of the above-mentioned type. This plastic-substrate LCD device is provided with a pair of acrylic (or epoxy) plastic substrates 103 for sandwiching liquid crystals 110. Each plastic substrate (0.1 to 0.5 mm thick) 103 has, on its inner and outer faces, hard coats 102, 104 (2 to 6 μm) made of an organosilane-, acrylic-, melamine-, urethane-related or like organic resin, through the dipping and baking. Inside the hard coat 104 there are provided an undercoat (100 to 600Å thick) 105 made of SiOx and an indium tin oxide (ITO) electrode 106 made of indium tin oxide, in this order, by the method of spattering deposition. Further provided inside of this by a known method are a top coat (upper protective coat) 107 for protecting the ITO electrode 106 and an orientation coat 108 for orienting the liquid crystals 110. In addition, represented by numeral 109 is a sealing material for sealing the liquid crystals 110, and by 101 is a polarizing plate.

In the above-described conventional plastic-substrate LCD device, it may occur in some cases that moisture which has been adsorbed in the plastic substrate 103 will emerge on the deposition surface of the substrate 103 (more precisely, of the hard coat 104) while the SiOx undercoat 105 and the ITO electrode 106 are subjected to spattering deposition. By this emergence, the deposition is obstructed such that the adhesion of the undercoat 105 and the ITO electrode 106 with respect to the substrate 103 is impaired. Also, since the inorganic-constituted SiOx undercoat 105 and ITO electrode 106 are provided in contact with the organic-constituted plastic substrate 103 and hard coat 104, there may occur some cracks to the undercoat 105 and the ITO electrode 106, disadvantageously, which can be attributed to difference in thermal expansion coefficient between organic and inorganic substances as well as to various strains of the substrate itself.

SUMMARY OF THE INVENTION

The object of the present invention is therefore to provide a plastic-substrate LCD device which can offer enhanced adhesion-to-substrate properties of an SiOx undercoat and an ITO electrode formed inside a plastic substrate and which can also prevent the occurrence of cracks.

In order to achieve the aforementioned object, there is provided a plastic-substrate liquid crystal display device having, on inner faces of a pair of plastic substrates for sandwiching liquid crystals, a hard coat made of an organic material, an undercoat made of silicon oxide, and an electrode made of indium tin oxide, in this order, wherein boron is contained in the material of the hard coat.

According to the plastic-substrate liquid crystal display device, the boron (B) is contained in the organic material of the hard coat (for example, as it is doped or contained as a functional group). Boron serves for gettering moisture, so that the moisture which has been adsorbed in the plastic substrate will no longer emerge on the deposition surface when the SiOx undercoat and the ITO electrode are subjected to spattering deposition. Accordingly, the adhesion-to-substrate property of the SiOx undercoat and the ITO electrode can be enhanced. With such intense adhesion to substrate of SiOx and ITO, there will no longer occur any cracks to the SiOx undercoat and ITO electrode.

There is also provided a plastic-substrate liquid crystal display device having, on inner faces of a pair of plastic substrates for sandwiching liquid crystals, a hard coat made of an organic material, an undercoat made of silicon oxide, and an electrode made of indium tin oxide, in this order, wherein a buffer layer made of titanium oxide is provided between the hard coat and the undercoat.

According to the plastic-substrate liquid crystal display device, there is provided the buffer layer made of titanium oxide (TiOx) between the hard coat made of an organic material and the undercoat made of SiOx. TiOx serves for gettering moisture, so that the moisture which has been adsorbed in the plastic substrate will no longer emerge on the deposition surface when the SiOx undercoat and the ITO electrode are subjected to spattering deposition. Accordingly, the adhesion-to-substrate property of the SiOx undercoat and the ITO electrode can be enhanced. Moreover, since the buffer layer made of TiOx is disposed between the organic-constituted plastic substrate and hard coat and inorganic-constituted undercoat and ITO electrode, the buffer layer can alleviate the effects of the difference between their thermal expansion coefficients and various strains of the substrate itself. Thus, there will no longer occur any cracks to the undercoat and ITO electrode.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The plastic-substrate LCD device of the present invention is now described in detail with reference to the accompanying drawings.

Figure 1:
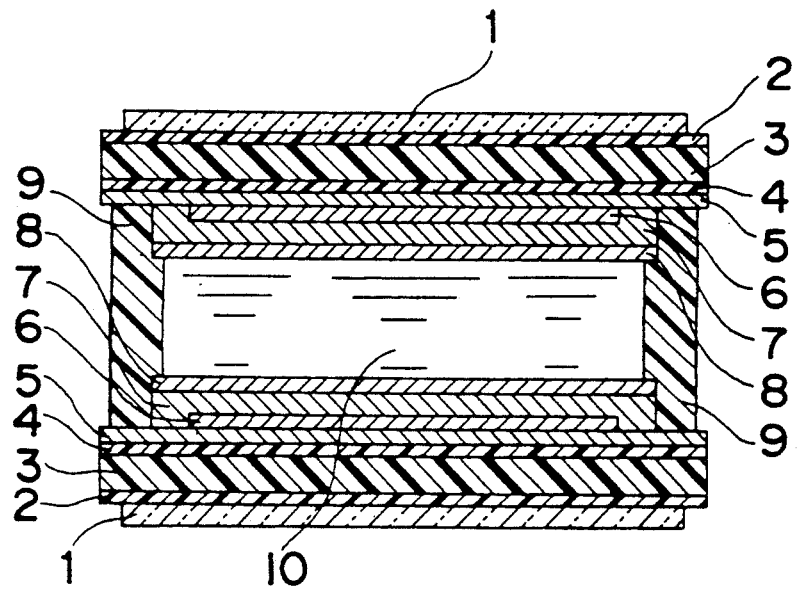
FIG. 1 is a sectional view showing a plastic-substrate LCD device of a first embodiment according to the present invention.

FIG. 1 shows a plastic-substrate LCD device of a first embodiment of the present invention. This plastic-substrate LCD device is provided with a pair of acrylic (or epoxy) plastic substrates 3 for sandwiching liquid crystals 10. Provided on the inner and outer faces of each plastic substrate (0.1 to 0.5 mm thick) 3 are hard coats (2 to 6 μm thick) 2, 4, respectively, formed of a material prepared by doping boron (B) or adding it as a functional group to an organosilane-, acrylic-, melamine-, or urethane-related, or like organic resin, by the method of dipping and baking. Further provided inside the hard coat 4 by spattering deposition are an undercoat (100 to 600Å thick) 5 made of SiOx and an ITO electrode 6 made of indium tin oxide, in this order. Further inside of this, a top coat (upper protective coat) 7 is provided for protecting the ITO electrode 6, and an orientation coat 8 for orienting the liquid crystals 10, by a known method. In addition, represented by numeral 9 is a sealing material for sealing the liquid crystals 10, and by 1 is a polarizing plate.

With the above structure, the boron (B) which is contained in the organic material of the hard coat 4 serves for gettering moisture, so that the moisture which has been adsorbed in the plastic substrate 3 will no longer emerge on the deposition surface when the SiOx undercoat 5 and the ITO electrode 6 are subjected to spattering deposition. Accordingly, the adhesion-to-substrate property of the SiOx undercoat 5 and the ITO electrode 6 can be enhanced. With such intense adhesion to substrate of SiOx and ITO, there will no longer occur any cracks to the SiOx undercoat 5 and ITO electrode 6.

Figure 2:
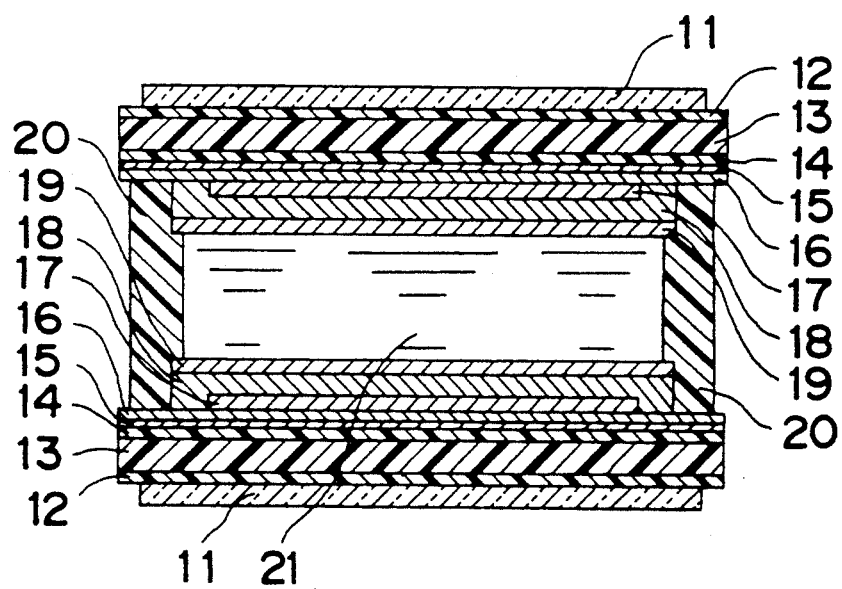
FIG. 2 is a sectional view showing a plastic-substrate LCD device of a second embodiment according to the present invention.
Figure 3:
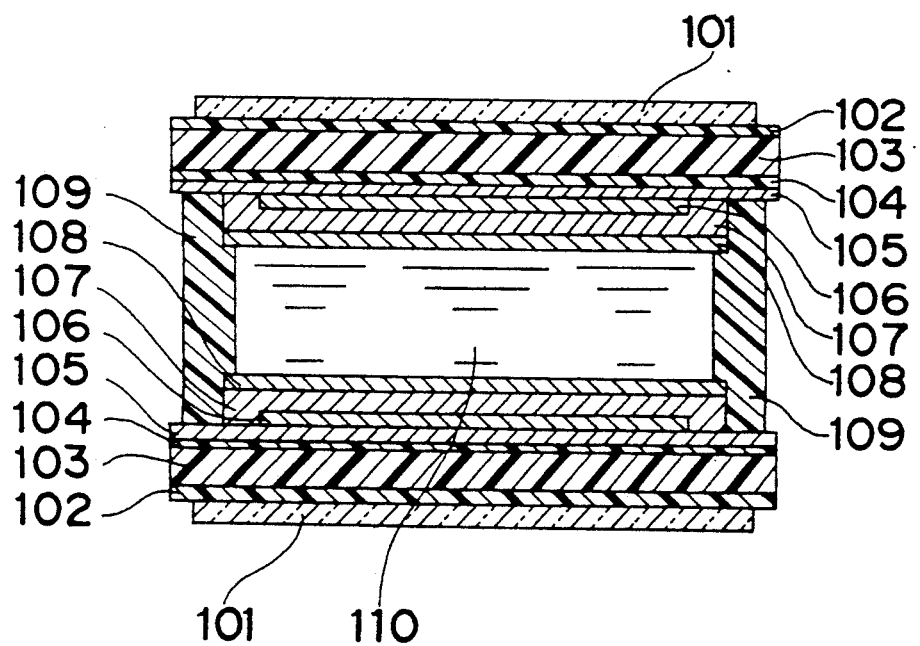
FIG. 3 is a sectional view showing a prior-art plastic-substrate LCD device.

FIG. 2 shows a plastic-substrate LCD device of a second embodiment of the present invention. This plastic-substrate LCD device is provided with a pair of acrylic (or epoxy) plastic materials 13 for sandwiching liquid crystals 21. Provided on the inner and outer faces of each plastic substrate (0.1 to 0.5 mm thick) 13 are hard coats (2 to 6 μm thick) 12, 14, respectively, made of a material such as an organosilane-, acrylic-, melamine-, or urethane-related or like organic resin, by the method of dipping and baking. Further provided inside the hard coat 14 by spattering deposition are a buffer layer 15 made of TiOx, an undercoat (100 to 600 thick) 16 made of SiOx, and an ITO electrode 17 made of indium tin oxide, in this order. Further inside of this, a top coat (upper protective coat) 18 is provided for protecting the ITO electrode 17, and an orientation coat 19 for orienting the liquid crystals 21, by a known method. In addition, represented by numeral 20 is a sealing material for sealing the liquid crystals 21, and by 11 is a polarizing plate.

With the above structure, the buffer layer 15 which is made of titanium oxide (TiOx) between the hard coat 14 made of an organic material and the undercoat 16 made of SiOx serves for gettering moisture, so that the moisture which has been adsorbed in the plastic substrate 13 will no longer emerge on the deposition surface when the SiOx undercoat 16 and the ITO electrode 17 are subjected to spattering deposition. Accordingly, the adhesion-to-substrate property of the SiOx undercoat 16 and the ITO electrode 17 can be enhanced. Moreover, since the buffer layer 15 made of TiOx is disposed between the organic-constituted plastic substrate 13 and hard coat 14 and inorganic-constituted undercoat 16 and ITO electrode 17, the buffer layer 15 can alleviate the effects of the difference between their thermal expansion coefficients and various strains of the substrate itself. Thus, there will no longer occur any cracks to the undercoat 16 and ITO electrode 17.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plastic-substrate liquid crystal display device having, on inner faces of a pair of plastic substrates for sandwiching liquid crystals, a hard coat made of an organic material, an undercoat made of silicon oxide, and an electrode made of indium tin oxide, in this order, wherein
   boron is contained in the material of the hard coat.

2. A plastic-substrate liquid crystal display device having, on inner faces of a pair of plastic substrates for sandwiching liquid crystals, a hard coat made of an organic material, an undercoat made of silicon oxide, and an electrode made of indium tin oxide, in this order, wherein
   a buffer layer made of titanium oxide is provided between the hard coat and the undercoat.

* * * * *